United States Patent [19]

Odasima et al.

[11] Patent Number: 4,687,333

[45] Date of Patent: Aug. 18, 1987

[54] MEASURING APPARATUS FOR OPTICALLY MEASURING THE THICKNESS OF A WATER FILM

[75] Inventors: Suzuo Odasima, Ayase; Takao Hida, Ebina; Mitsuru Mitamura, Yokohama, all of Japan

[73] Assignees: Toshiba Electronic Systems Co., Ltd.; Toshiba Machine Co., Ltd., both of Tokyo, Japan

[21] Appl. No.: 810,257

[22] Filed: Dec. 18, 1985

[30] Foreign Application Priority Data

Dec. 28, 1984 [JP] Japan ................. 59-275680

[51] Int. Cl.$^4$ .................................... G01B 11/00
[52] U.S. Cl. .................................. 356/382; 250/339; 356/375; 356/418
[58] Field of Search .............. 356/381, 382, 418, 375; 250/339

[56] References Cited

U.S. PATENT DOCUMENTS

| | | | |
|---|---|---|---|
| 3,017,512 | 1/1962 | Wolbert | 356/382 |
| 3,960,451 | 6/1976 | Wirz et al. | 356/382 |
| 4,076,424 | 2/1978 | Ida | 356/418 |

Primary Examiner—R. A. Rosenberger
Attorney, Agent, or Firm—Oblon, Fisher, Spivak, McClelland & Maier

[57] ABSTRACT

A water film surface is irradiated with light from a detecting unit's light source. Light reflected from the water film surface is converted into an electrical signal by a sensor (photoelectric converting means) in the unit. The converted electrical signal is supplied to a processing unit through a cable. The processing unit calculates the water film thickness based on the electrical signal. The calculated thickness is displayed on a display in the detecting unit.

4 Claims, 4 Drawing Figures

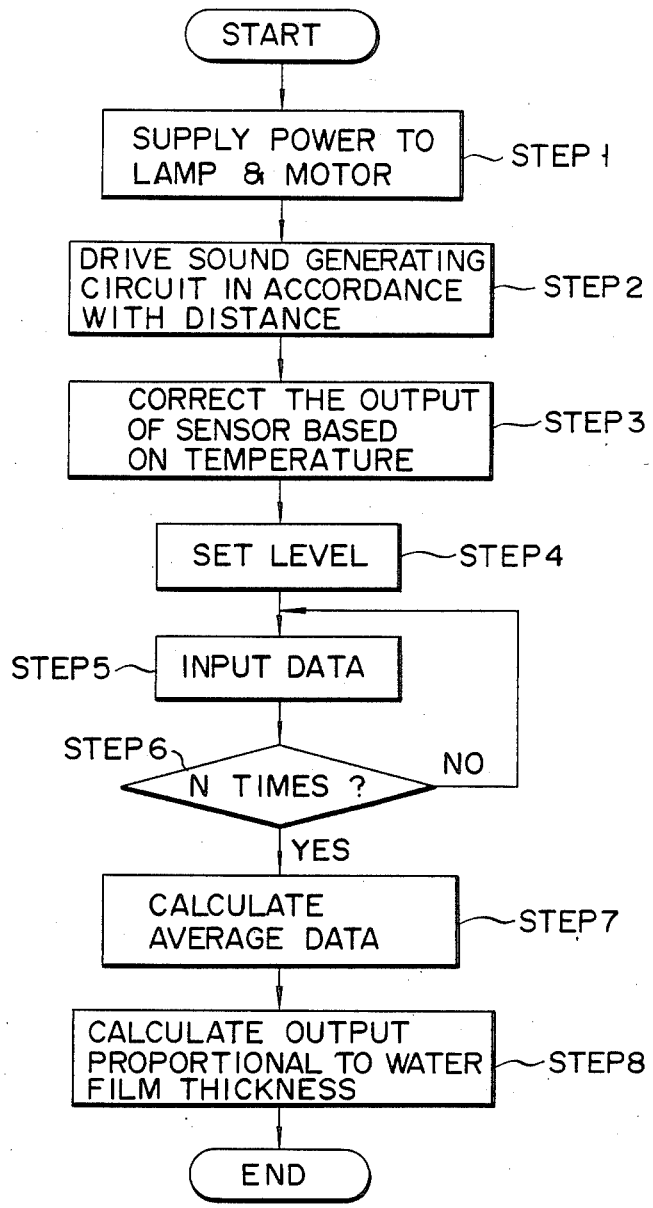

MEASURING APPARATUS FOR OPTICALLY MEASURING THE THICKNESS OF A WATER FILM

BACKGROUND OF THE INVENTION

The present invention relates to a measuring apparatus for optically measuring the thickness of a water film attached to the surface of a substance such as a metal.

Conventional apparatuses for measuring the thickness of a water film attached to the surface of a metal are not portable. Due to difficulties in installation and measurement methods, it is difficult to move the apparatus to a desired measurement location.

SUMMARY OF THE INVENTION

The present invention has been devised in consideration of the above situation, and has as its object to provide a measuring apparatus for optically measuring the thickness of a water film which can both easily measure the thickness of the water film and be moved to desired locations.

According to the present invention, there is provided a measuring apparatus for optically measuring the thickness of a minute water film attached to a surface of a substance such as a metal, comprising:

a detecting unit having light radiation means for radiating light onto a surface of the water film, and means for converting light reflected from the surface of the water film into an electrical signal;

display means arranged in the detecting unit;

a processing unit, connected to the detecting unit through a cable, for processing the electrical signal supplied through the cable to calculate the thickness of the water film and to display the calculated thickness on the display means; and means for maintaining an appropriate distance between the detecting unit and the surface of the water film.

BRIEF DESCRIPTION OF THE DRAWINGS

FIG. 4 is a flow chart showing microcomputer signal processing in the measuring apparatus for optically measuring the thickness of a water film of the present invention.

DETAILED DESCRIPTION OF THE PREFERRED EMBODIMENT

Figure 1:
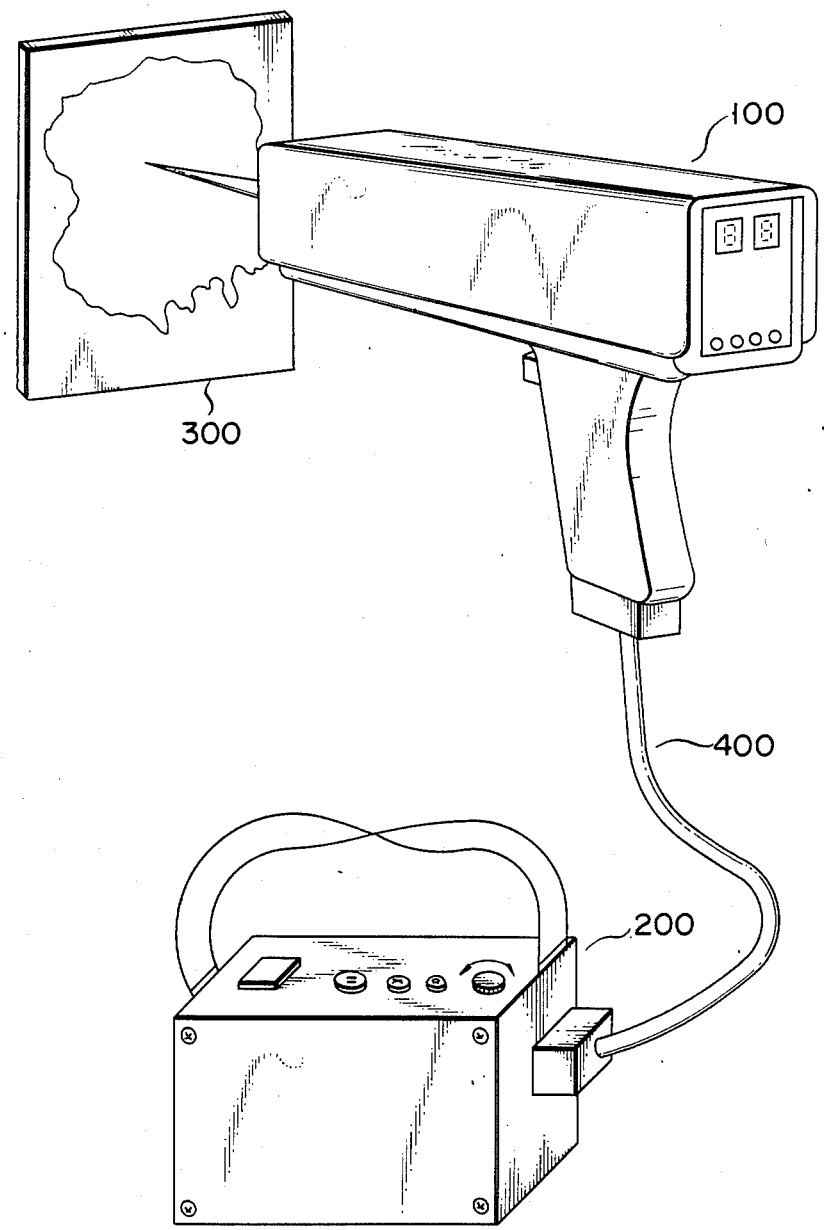
FIG. 1 is a perspective view showing an arrangement of a measuring apparatus for optically measuring the thickness of a water film according to an embodiment of the present invention.

An embodiment of the present invention will be described with reference to the accompanying drawings. FIG. 1 is a perspective view showing an arrangement of the embodiment. As shown in FIG. 1, the measuring apparatus for optically measuring the thickness of a water film of the present invention comprises detecting unit 100 and processing unit 200.

In order to measure the thickness of a minute water film attached to the surface of a substance such as a metal, unit 100 radiates light onto surface 300 of the water film (to be referred to as water film surface 300 hereinafter). Light reflected from surface 300 is received by unit 100 and converted into an electrical signal. Unit 200 processes the electrical signal converted by unit 100, thus obtaining the film thickness. In this case, the electrical signal from unit 100 is sent through bus cable 400.

Figure 2:
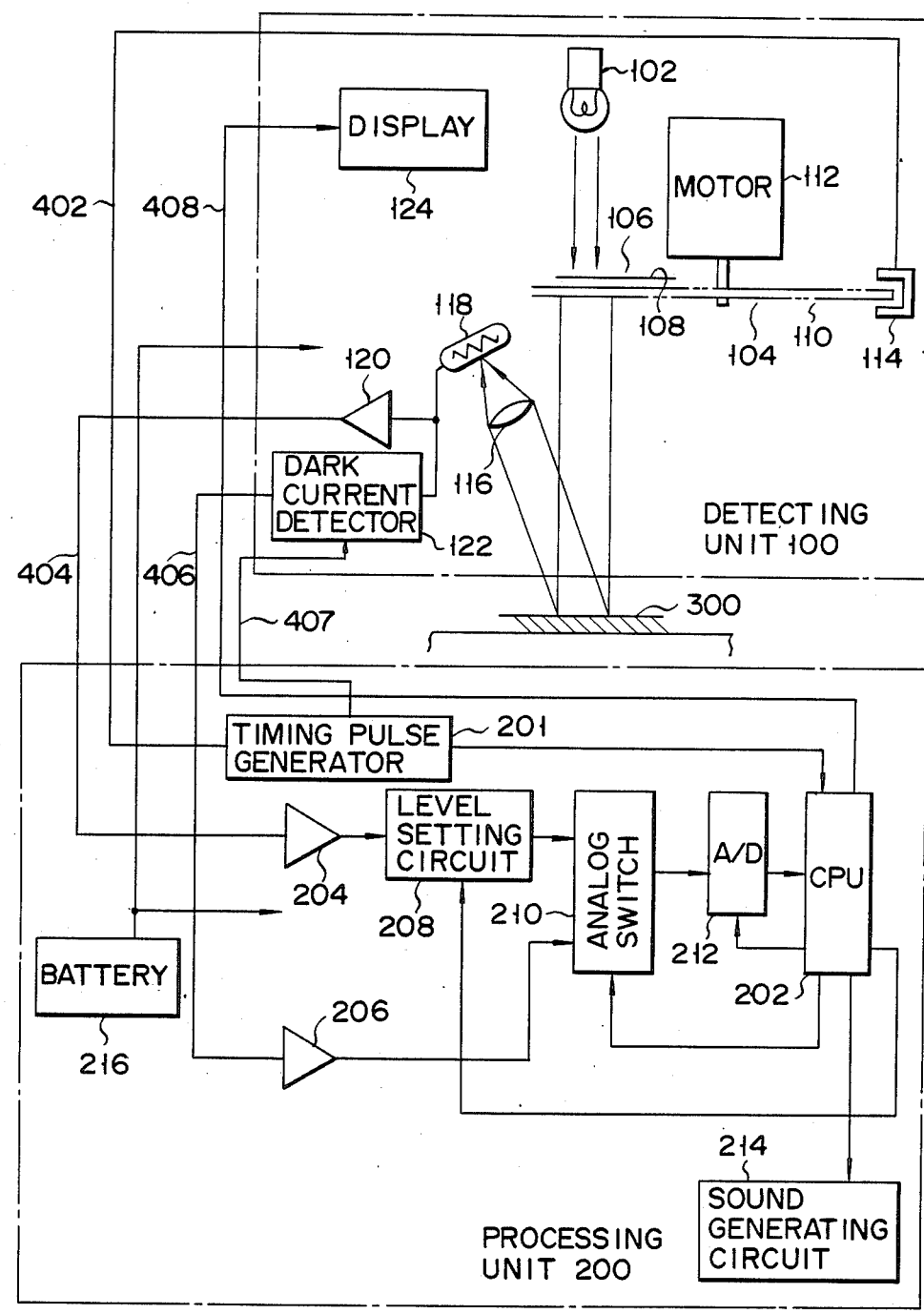
FIG. 2 is a block diagram showing a detailed arrangement of the measuring apparatus for optically measuring the thickness of a water film according to the present invention.

FIG. 2 shows the arrangement of units 100 and 200, shown in FIG. 1, in more detail. Unit 100 has, as light source 102, such as an incandescent lamp. Light emitted from source 102 passes through reference signal filter 106 or measurement signal filter 108 arranged on filter disk 104, or through transmission hole 110 formed in disk 104, and is radiated onto surface 300. Filters 106 and 108 and hole 110 are concentric.

Disk 104 is rotated by motor 112 at a predetermined speed. The outer periphery of disk 104 is detected by sync signal detector 114 (e.g., a photocoupler). The detection signal from detector 114 is supplied as a position detection signal to timing pulse generator 201 through cable 402 of bus cable 400. Timing pulse generator 201 detects a timing pulse in response to the position detection signal. The timing pulse is supplied to microcomputer 202 (hereinafter referred to as CPU 202 hereinafter) and dark current detector 122. Thus, light passing through either of filters 106 and 108, which are rotated together with disk 104, is radiated onto water film surface 300 whereupon it can be detected.

Light reflected from water film surface 300 is focused by convergence lens 116 and received by sensor 118 (e.g., a photodiode) for photoelectric conversion. The output from sensor 118 is amplified by amplifier 120 and then supplied to first amplifier 204 in processing unit 200 through cable 404 of bus cable 400 for further amplification. The output from sensor 118 is also converted into DC by dark current detector 122, and is then supplied to second amplifier 206 through cable 406 of bus cable 400 for further amplification. In this latter case, dark current detector 122 operates in response to the timing pulse from timing pulse generator 201 through cable 407 of bus cable 400.

Display 124 of unit 100 displays the film thickness which is calculated by CPU 202 in unit 200 and sent through cable 408 of bus cable 400.

The output from first amplifier 204 in unit 200 is set at a certain level by level setting circuit 208 and is supplied to analog switch 210. Switch 210 also receives the output from second amplifier 206. Switch 210 selectively supplies to analog/digital (A/D) converter 212 the output from circuit 208 or amplifier 206. Switching control is performed by CPU 202. The digital signal from converter 212 is sent to CPU 202. CPU 202 controls circuit 208, converter 212, and sound generating circuit 214, in addition to switch 210.

Power to components in units 100 and 200 is supplied by battery 216 in unit 200.

The operation of the measuring apparatus for optically measuring the thickness of a water film with the above arrangement will be described with reference to FIGS. 3 and 4. As shown in the flow chart of FIG. 4, light source 102 is turned on and motor 112 is energized (step 1).

In this state, unit 100 radiates light emitted from source 102 onto water film surface 300 alternately through filters 106 and 108, mounted on disk 104 which is fixed to motor 112. Filter 106 transmits a reference beam with a wavelength which cannot be absorbed by water film surface 300. Filter 108, on the other hand, transmits a measurement beam with a wavelength which is absorbed by the water film. Disk 104 has hole 110 through which visible light is permitted to pass in order to indicate the irradiated position of the reference and measurement beams. A color or ND (Neutral Density) filter can be mounted on hole 110, as desired.

Reflected reference and measurement beams from water film surface 300 are converged by convergence lens 116, and are converted into an electrical signal by sensor 118. The electrical signal is amplified by amplifier 120, and, at the same time, is detected a dark current level by dark current detector 122.

In unit 200, the electrical signal amplifier by amplifier 120 is further amplified by first amplifier 204. The dark current level detected by dark current detector 122 is amplified by second amplifier 206. The output from first amplifier 204 is subjected to level correction by circuit 208. The corrected signal is then converted into a digital signal by converter 212 through switch 210 in accordance with a signal from CPU 202, and is supplied to CPU 202. Similarly, the output from second amplifier 206 is converted into a digital signal by converter 212 through switch 210 in accordance with a signal from CPU 202, and is then supplied to CPU 202.

Figure 3:
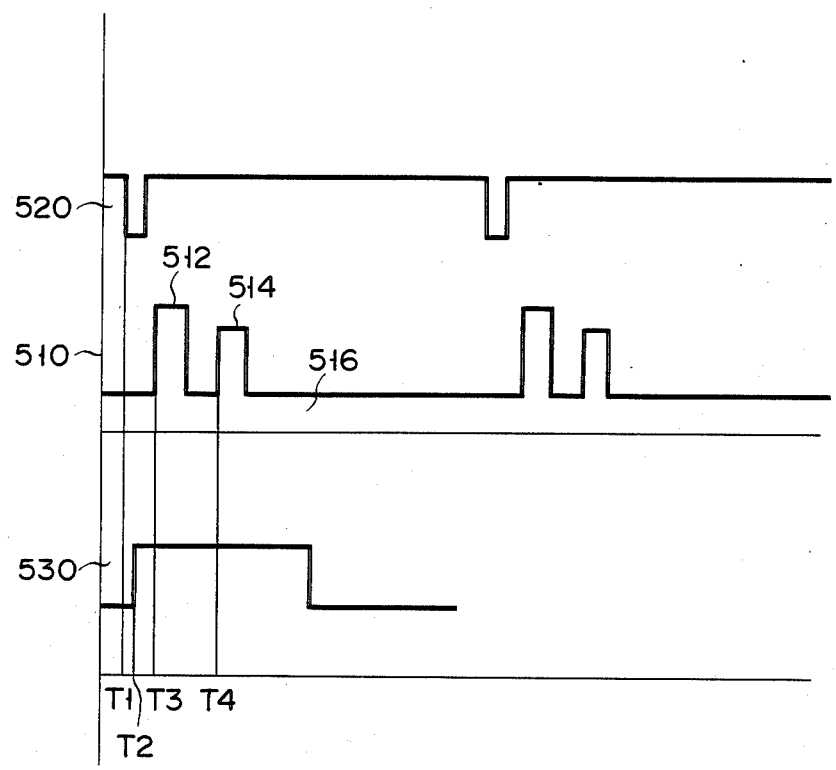
FIG. 3 is a timing chart showing the relationship between electrical signals of the measuring apparatus for optically measuring the thickness of a water film of the present invention.

FIG. 3 shows electrical signals converted by sensor 118. Electrical signal 510, converted by sensor 118, consists of reference signal 512, based on the reference beam with a wavelength which cannot be absorbed by the water film, measurement signal 514, based on the measurement beam with a wavelength which is absorbed by the water film, and base-line level signal 516.

Referring to FIG. 3, reference numeral 520 denotes a motor sync signal obtained in synchronism with the rotation of motor 112. Signal 20 is generated at timing T1 by sync detector 114.

In order to convert signal 510 (consisting of signals 512, 514, and 516) into a digital signal, CPU 202 generates A/D conversion gate signal 530 at timing T2 based on signal 520. Digital signal 510, that is, the level value of signal 512 at timing T3, the level value of signal 514 at timing T4, and the value of base-line level signal 516, is then supplied to CPU 202.

Note that level setting circuit 208 is controlled by a control signal from CPU 202 so that the output therefrom is kept constant within a predetermined input level range.

In order to maintain an appropriate distance between unit 100 and water film surface 300, when the input signal level to circuit 208 exceeds a preset level, CPU 202 drives sound generating circuit 214 to generate an alarm sound. For example, a signal which changes either the volume or frequency of sound when the actual distance falls outside the preset range is generated and sent to a sound generator such as an earphone, thus ensuring easy maintenance of an appropriate distance (step 2).

As described above, visible light is radiated to indicate the irradiated position of the light beams. After the irradiated position is confirmed, measurement begins. In other words, temperature correction processing of sensor 118 is performed based on the level of the output of second amplifier 206 (step 3). Based on signal 512, CPU 202 accurately sets levels (step 4) and performs data input processing (step 5).

Furthermore, signals 512, 514 and 516 are input N times (step 6), and these input signals are processed in step 5. The average value of each these signals is then obtained (step 7). The average values change in accordance with the water film thickness; therefore, a value proportional to the water film thickness can be obtained from these average values using the following equation (step 8):

(Output proportional to water film thickness) = {(average measurement signal level)/(average reference signal level signal level)} × (temperature correction coefficient)

The obtained output is converted by CPU 202 into the display data required by the operator, and is displayed by display 124 in unit 100.

According to the present invention, since the detecting unit and the processing unit are provided separately, they can be easily moved to and used in a desired location, resulting in an improved measurement apparatus for optically measuring the thickness of a water film which the thickness of the water film can be easily measured.

What is claimed is:

1. A measuring apparatus having a detecting unit and processing unit provided separately, for optically measuring the thickness of a water film attached to a surface of a substance such as a metal, comprising:

light radiation means provided in the detecting unit, for periodically radiating, on a surface of the water film, a reference beam having a wavelength that cannot be absorbed by the water film, and a measurement beam having a wavelength that is absorbed by the water film;

photoelectric conversion means provided in the detecting unit, for receiving the reference and measurement beams reflected by the water film, and for generating a reference signal and measurement signal responsive to quantities of the received beams;

processing means, which receives the signals generated by said photoelectric conversion means, for calculating the thickness of the water film in accordance with levels of the reference and measurement signals, and for temperature-correcting the calculated thickness of the water film, in response to levels of the signals that are output from said photoelectric conversion means when said photoelectric conversion means receives no beams reflected by the water film;

display means for displaying the temperature-corrected thickness of the water film; and distance indicating means for receiving the reference signal, and for producing a sound responsive to a level of the received signal, the level of the reference signal varying in response to a distance between the detector unit and the water film.

2. A measuring apparatus according to claim 1, wherein said processing unit comprises:

level holding means for holding a level of the signal that is output from said photoelectric conversion means when said photoelectric conversion means receives no beams reflected by the water film;

output selection means for receiving the reference signal, the measurement signal, and the signal held by said level holding means, and for selecting signals to be output therefrom, said output selection means outputting the reference and measurement signals when said photoelectric conversion means receives no beams reflected by the water film, and the signal held by said level holding means at the time other than the case wherein said photoelectric conversion means receives no beams reflected by the water film; and calculating means for calculating the thickness of the water film, on the basis of the signal selectively output from said output selection means, and for temperature-correcting the calculated thickness of the water film.

3. A measuring apparatus according to claim 2, wherein said calculating means generates a signal responsive to the level of the reference signal supplied from said output selection means, and said distance indicating means produces a sound responsive to the signal supplied from said calculating means.

4. A measuring apparatus according to claim 3, wherein said calculating means generates a signal responsive to the level of the reference signal when the level of the reference signal is outside a predetermined range, and said distance indicating means produces a sound responsive to the signal supplied from said calculating means.

* * * * *